UNITED STATES PATENT OFFICE.

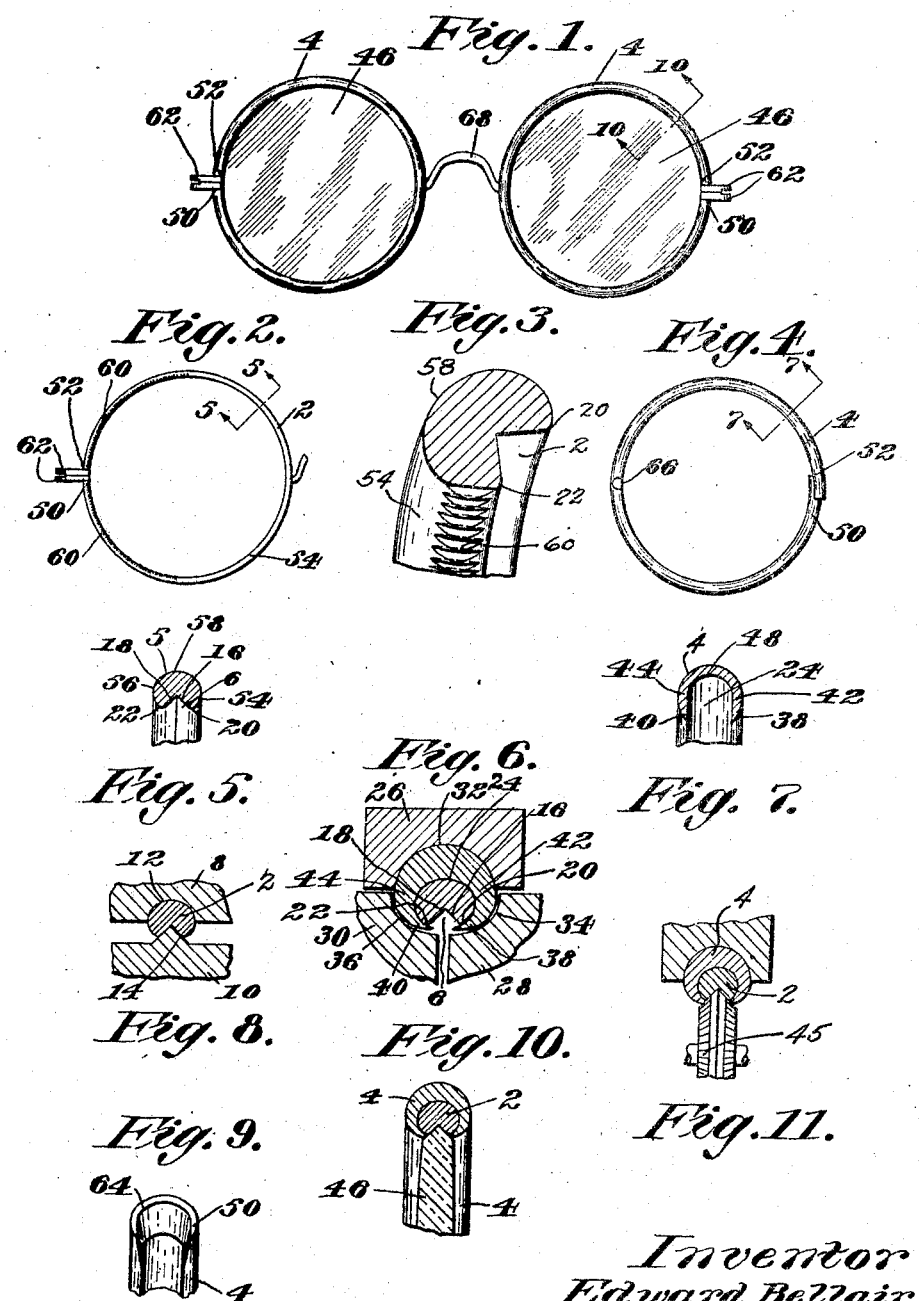

EDWARD BELLAIR, OF SOUTHBRIDGE, MASSACHUSETTS, ASSIGNOR TO DUPAUL, YOUNG OPTICAL CO., OF SOUTHBRIDGE, MASSACHUSETTS, A CORPORATION OF MASSACHUSETTS.

OPHTHALMIC MOUNTING AND METHOD OF MAKING THE SAME.

1,374,178.  Specification of Letters Patent.  Patented Apr. 12, 1921.

Application filed July 28, 1920. Serial No. 399,485.

*To all whom it may concern:*

Be it known that I, EDWARD BELLAIR, a citizen of the United States, and a resident of Southbridge, in the county of Worcester and Commonwealth of Massachusetts, have invented a new and useful Improvement in Ophthalmic Mountings and Methods of Making the Same, of which the following is a specification.

The present invention relates to ophthalmic mountings, particularly mountings constituted of a non-metallic rim combined with a metal rim, and to methods of making the same.

Though by no means restricted thereto, the invention is particularly applicable to ophthalmic mountings the inner lens-receiving rims of which are of metal. It has heretofore been proposed to unit the rims of such a mounting by pressing the non-metallic material into contact with the metal. These proposals, however, have been commercially impractical because requiring the employment of specially shaped metal rims. It has hitherto been considered impossible to hold together a standard metal lens-receiving rim and a non-metallic rim save by the use of externally applied mechanisms like pins, screws, clips and the like.

This invention has for its chief object to provide a new and improved ophthalmic mounting comprising a standard metal rim to which a non-metallic rim is secured by pressure alone, and a novel method of making such a mounting.

To this end, a feature of the invention resides in corrugating or otherwise suitably roughening the sides of a standard metal rim where separation from the non-metallic rim would otherwise be likely to take place, and firmly pressing a non-metallic rim against and around the metal rim so as to inclose the latter, causing the roughened surface to bite into the adjacent non-metallic surface and securely locking the rims together.

Other and further objects of the invention will be made clear from the following description taken in connection with the accompanying drawings, in which Figure 1 is a view in front elevation of a pair of spectacles embodying the present invention, the temples being removed for clearness; Fig. 2 is a similar view of one of the metal rims; Fig. 3 is an enlarged detail view of a portion of the rim shown in Fig. 2; Fig. 4 is a view in rear elevation of one of the non-metallic rims before it is mounted upon the metal rim; Fig. 5 is a sectional view taken upon the line 5—5 of Fig. 2; Fig. 6 is a sectional view, illustrating the process of mounting the non-metallic rim upon the metallic rim; Fig. 7 is a sectional view, taken upon the line 7—7 of Fig. 4; Fig. 8 illustrates a step in the manufacture of the metallic rim; Fig. 9 is an inner view of one of the ends of the non-metallic rim; Fig. 10 is a sectional view taken upon the line 10—10 of Fig. 1; and Fig. 11 is a detail view illustrating another step in the process of manufacturing the mounting.

The invention is illustrated in its preferred form as embodied in a spectacle frame or mounting comprising two elements only, one a split inner metal rim 2 and the other a split outer rim 4 constituted of non-metallic, plastic material, like xylonite, celluloid or other composition. The inner rim is of standard shape, its exterior surface being substantially circular in cross-section, as shown more particularly at 5 in Fig. 5, and it is provided with an inner lens-receiving groove 6. The inner rim is manufactured from a cylindrical rod and the groove 6 is formed therein by running the rod through between roller dies 8 and 10, the active face of the die 8 of which is semi-circular in cross-section, as shown at 12, and the active face of the die 10 of which is sharply angular, as shown at 14. As the diameter of the semi-circular face 12 is a little larger than that of the rod, the rod becomes somewhat flattened, as shown, by the action of the dies 8 and 10. The face 14 of the die 10 swages the metal inwardly to form the groove 6, incidentally causing the faces 16 and 18 of the groove to become rounded at their junction with the exterior surface 5, as shown at 20 and 22.

The non-metallic rim 4 is also standard, being formed by longitudinally grooving at 24 a cylindrical rod of the substance, and then bending it into substantially circular shape, as illustrated in Fig. 4, with the annular groove or slot innermost. The rim 2 is mounted within the groove 24 of the rim 4, after which the combined frame is placed between dies 26, 28 and 30 at a time when the dies are separated. The die 26 is provided with an active face 32 that is substantially semi-circular in cross-section and the dies 28 and 30 are provided with active faces 34 and 36 the cross-sectional outlines of which are substantially quarter circles. Upon the dies being brought together, the non-metallic material will be compressed against the metal. The die faces 34 and 36 will cause the side wings 42 and 44 of the rim 4 to become pressed against and around the metal rim, and the edges 38 and 40 of the wings to project beyond the boundaries of the lens-receiving groove 6. This is because the interior cross-sectional periphery of the non-metallic rim 4 is greater than the corresponding exterior periphery of the metal rim 2, as is shown in Fig. 6. The non-metallic material may be set in the new position in any well-known manner, as by continued pressure and the application of heat. The edges 38 and 40 of the wings 42 and 44 may then be trimmed, as by means of the rotary cutter 45 illustrated in Fig. 11, to provide a free, unobstructed passage for the lens 46 to the groove 6. By providing large enough wings so that their edges may be compressed beyond the boundaries of the groove 6 and then trimmed, a more secure union is obtained than if the wings were originally of smaller dimension.

The above-described process results in shaping the slot 24 substantially circular in cross-section, so as to cause it to conform to the surface 5 of the rim 2, with the mouth of the slot contracted to inclose the rim 2 within the slot. As the lens-receiving groove 6 is narrower than the diameter of the metal rim 2, and as the trimmed edges 38 and 40 are bent over and pressed against the rounded surfaces 20 and 22 which merge with the faces of the groove 6, the metal rim is well inclosed by the non-metallic rim. This is nevertheless insufficient of itself to cause the rims to unite firmly together. Owing to the rounded surface 5 of the standard rim 2 and the corresponding engaging rounded surface 24 of the rim 4, the rims are enabled to slip one over the other and ultimately to become detached at their free ends 50 and 52. To prevent the separation of the rims, the use of clips, pins, screws and other external securing means has heretofore been regarded as essential.

According to the present invention, the use of such additional securing elements is rendered entirely unnecessary. Instead, the surface 5 of the rim 2 is corrugated or otherwise roughened so that when the dies 26, 28 and 30 compress the rims together, the corrugations or other projections formed by the roughening process bite into the surface of the adjacent non-metallic material and the latter flows into the interstices between the corrugations or other projections, so that after the non-metallic material has become set, the two rims are very firmly locked together, more firmly, even, than would be the case if screws, clips or the like were employed.

In practice, it is unnecessary to roughen or corrugate the whole surface 5. Roughening the opposite sides 54 and 56 alone of this surface, for example, will fully answer the purpose, and the roughening need not extend far away from the rounded surfaces 20 and 22. A large intermediate portion 58 of the surface 5 is therefore shown smooth. It is necessary to roughen those portions only of the metal rim, furthermore, at which the non-metallic rim is most likely to become detached therefrom, as at the free ends 50 and 52. The corrugations 60 are accordingly shown as formed upon those portions only of the metal rim which are near the temple end pieces 62. In an eyeglass structure, for the same reason, the metal would be roughened near the junction of the split ends of the rim with the bridge. If the split ends of the rim can be made to hold together, the intermediate portions will hold also. It is found preferable, for convenience, to have the corrugations extend radially inward toward the center of the rim.

The end pieces 62 are usually secured to the free ends of the rim 2 by soldering, and lumps of solder are therefore frequently found at the juncture of the end pieces with the rim. These would interfere with the ends of the non-metallic rim becoming properly pressed in against the ends of the metal rim, and would result in a tendency for the rim to become separated. The inner face 24 of the non-metallic rim 4 is accordingly gouged out at the ends, as shown at 64, Fig. 9, the better to house accidental lumps of solder and to eliminate the possibility of such lumps causing an insecure union of the rims at the ends. The non-metallic rims 4 are provided with notches 66 within which the ends of the bridge 68 are adapted to be received.

According to the present invention, therefore, a very efficient mounting of the above-described character may be readily and cheaply produced of a minimum number of standard elements. It will be obvious that modifications may be made by persons skilled in the art without departing from the spirit and scope as defined in the appended claims.

What is claimed as new is:

1. An ophthalmic mounting constituted of two elements only, one a rim of substantially circular cross-section, and the other a rim having an annular slot substantially circular in cross-section and shaped to conform to the surface of the first-named rim, the mouth of the slot being contracted so that the first-named rim may be inclosed within the slot, one of the rims being roughened along the surface of engagement with the other rim and said other rim being constituted of plastic material, and the rims being pressed into engagement to cause the roughened surface to bite into the adjacent plastic surface, thereby locking the rims together.

2. An ophthalmic mounting constituted of two elements only, one an inner metal rim of substantially circular cross-section having an inner lens-receiving groove and an exterior roughened surface, the faces of the groove being rounded at their junction with the exterior surface, and the other an outer non-metallic rim having an inner annular slot within which the metal rim is mounted, the wings of the non-metallic rim being pressed against and around the metal rim to the boundaries of the lens-receiving groove to cause the roughened surface to bite into the adjacent non-metallic surface, whereby the metal rim is inclosed by the non-metallic rim and the rims are locked together.

3. An ophthalmic mounting constituted of two elements only, one an inner metal rim of substantially circular cross-section having an inner lens-receiving groove and an exterior surface the sides of which are corrugated, and the other an outer non-metallic rim having an inner annular slot of substantially circular cross-section and shaped to conform to the exterior surface of the metal rim, the mouth of the slot being contracted to inclose the metal rim within the slot, and the rims being pressed into firm engagement to cause the corrugations to bite into the adjacent non-metallic surface, thereby locking the rims together.

4. An ophthalmic mounting constituted of two elements only, one a split inner metal rim of substantially circular cross-section having an inner lens-receiving groove of narrower width than the diameter of said cross-section and having end pieces soldered to the split ends of the rim, the exterior surface of the rim being radially corrugated along the sides near the split ends, and the other a split outer non-metallic rim having an inner annular slot of substantially circular cross-section and shaped to conform to the exterior surface of the metal rim, the wings of the slot being pressed against and around the metal rim to inclose the metal rim within the slot, thereby locking the rims together, the edges of the wings being trimmed along the boundaries of the lens-receiving groove, and the ends of the non-metallic rim being interiorly gouged out to receive projecting pieces of solder near the end pieces.

5. The method of making a frame which comprises roughening the exterior surface of an element, mounting the element within the slot of another element that is constituted of plastic material, the interior cross-sectional periphery of the other element being greater than the corresponding exterior periphery of the roughened element, pressing the wings of the slotted element firmly against and around the roughened element to inclose the roughened element within the slot and to cause the roughened surface to bite into the adjacent plastic surface, thereby locking the elements together and causing the edges of the wings to project beyond the roughened element, and trimming the projecting edges.

6. The method of making an ophthalmic mounting which comprises corrugating the sides of the exterior surface of a metal rim that is substantially circular in cross-section and that is provided with an inner lens-receiving groove of smaller width than the diameter of said cross-section, mounting the rim within the annular slot provided between the wings of a non-metallic rim, the interior cross-sectional periphery of the non-metallic rim being greater than the corresponding exterior periphery of the metal rim, pressing the wings of the non-metallic rim firmly against and around the metal rim to inclose the metal rim within the slot and to cause the corrugations of the metal rim to bite into the adjacent non-metallic surface, thereby locking the rims together and causing the edges of the wings to project beyond the boundaries of the lens-receiving groove, and trimming the projecting edges of the wings along said groove boundaries.

7. An ophthalmic mounting constituted of two elements only, one an inner metal rim of substantially circular cross section having an inner lens-receiving groove, and the other an outer non-metallic rim having an inner annular slot within which the metal rim is mounted, the rims being formed with coacting means for locking the rims together.

8. A frame constituted of two elements only, one having an exterior surface of substantially circular cross section and having a groove of narrower width than the diameter of the element, and the other having an inner annular slot of substantially circular cross section, the surface of the slot being in engagement with said exterior surface, one of the elements being roughened along the surface of engagement with the other element, said last-named element being constituted of plastic material, and the wings of the slotted element being pressed against and around the grooved element to the boundaries of the groove, whereby the grooved element is inclosed by the slotted element and the elements are locked together.

9. An ophthalmic mounting constituted of two elements only, one an inner metal rim the exterior surface of which is substantially circular in cross section and having an inner lens-receiving groove, the surfaces at the junction between the exterior surface and the faces of the groove being rounded, and the other an outer non-metallic rim having an inner annular slot shaped substantially circular in cross section to conform to the said exterior surface and within which the metal rim is mounted, the wings of the non-metallic rim being pressed against and around the exterior surface and the said rounded surfaces of the metal rim to the boundaries of the groove.

In testimony whereof I have hereunto subscribed my name this 24th day of July, 1920.

EDWARD BELLAIR.